Oct. 4, 1955    J. J. RILEY    2,719,946
MULTIPLE PHASE TRANSFORMER AND DRY DISC RECTIFIER ASSEMBLY
FOR RESISTANCE WELDING MACHINES AND THE LIKE
Filed May 5, 1952    2 Sheets-Sheet 1

INVENTOR
JOSEPH J. RILEY

BY Francis J. Klempay
ATTORNEY

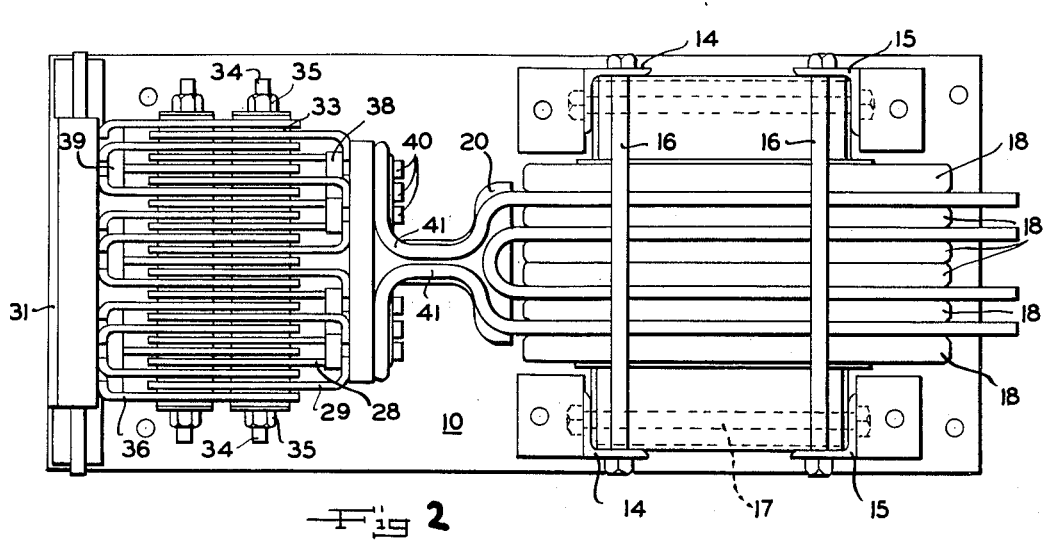
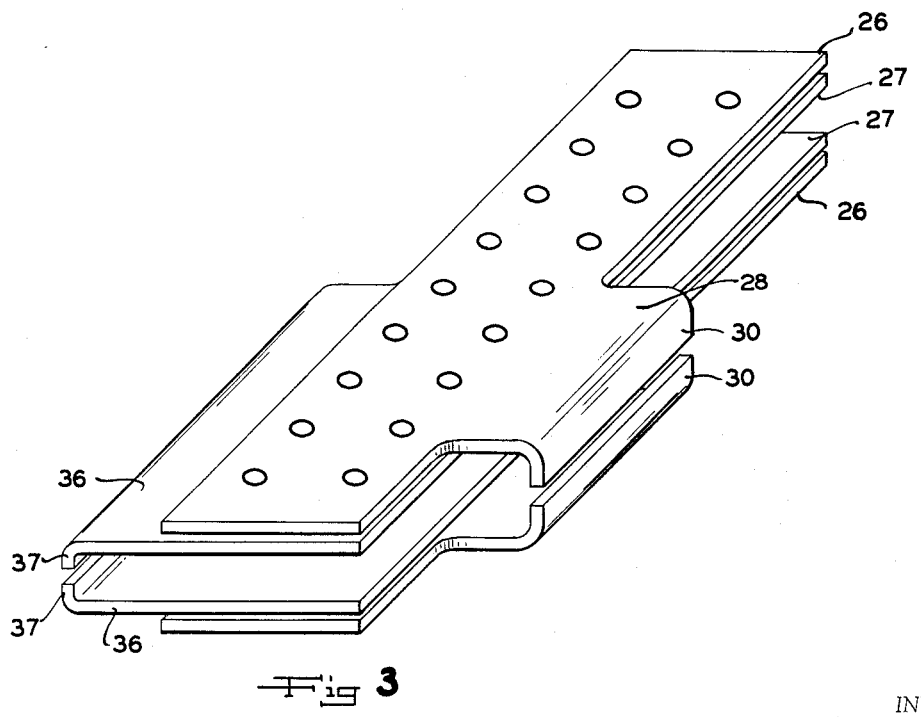

United States Patent Office 2,719,946
Patented Oct. 4, 1955

2,719,946

MULTIPLE PHASE TRANSFORMER AND DRY DISC RECTIFIER ASSEMBLY FOR RESISTANCE WELDING MACHINES AND THE LIKE

Joseph J. Riley, Warren, Ohio, assignor to The Taylor-Winfield Corporation, Warren, Ohio, a corporation of Ohio Application May 5, 1952, Serial No. 286,216

9 Claims. (Cl. 321—8)

The present invention relates to high capacity direct current power supply apparatus for resistance welding machines and the like, and more particularly to a novel and substantially improved multiple phase transformer-rectifier "power pack" assembly adapted for translating multiple phase alternating current electrical power into uni-directional power suitable for use in direct current electric resistance welding apparatus, for example.

The ultimate object of the present invention is to provide a novel and improved transformer-rectifier power pack assembly of highly compact and unitary construction which is capable of delivering high power output for sustained periods of operation.

Another object of the invention is the provision of a transformer-rectifier power pack assembly utilizing a dry disc rectifying device of novel construction whereby A. C. input conductor plates of the rectifying device may be advantageously connected in "delta," for example, to a three-phase transformer bank, and whereby the input conductor plates so connected may be advantageously arranged for common association with a small number of D. C. output conductor plates.

Another object of the invention is the provision of power pack apparatus as set forth above which is compact and arranged to conduct large currents with a minimum impedance loss through the apparatus. Also the invention seeks to provide power pack apparatus of such electrical characteristics that when coupled with D. C. electric resistance welding apparatus, for example, a rising D. C. wave front is obtained during the initial portion of an operating cycle. This arrangement is highly desirable in the resistance welding art since it permits the welding electrodes to be brought into better contact with the workpieces before welding current reaches its maximum value.

Yet another object of the invention is the provision of transformer-rectifier power pack apparatus including a compact and unitary dry disc rectifier device wherein the rectifier device, in itself, may be readily assembled and disassembled, and when assembled may be readily assembled into the power pack apparatus. In this connection my apparatus is so constructed that a minimum of accurate machine work is required in its assembly whereby such assembly is substantially simplified and hastened.

My invention further seeks to provide a compact and unitary power pack apparatus which, in addition to having low resistive and reactive losses, is provided with highly efficient cooling means arranged to quickly conduct heat away from all parts of the apparatus.

The above and other objects and advantages of the invention will become apparent upon full consideration of the following detailed specification and accompanying drawing wherein is disclosed a certain preferred embodiment of my invention.

In the drawing:

Figure 2 is a top plan view of the power pack apparatus of Figure 1; and

Figure 3 is an enlarged perspective view of certain of the rectifier conductor plates of my apparatus.

Figure 1:
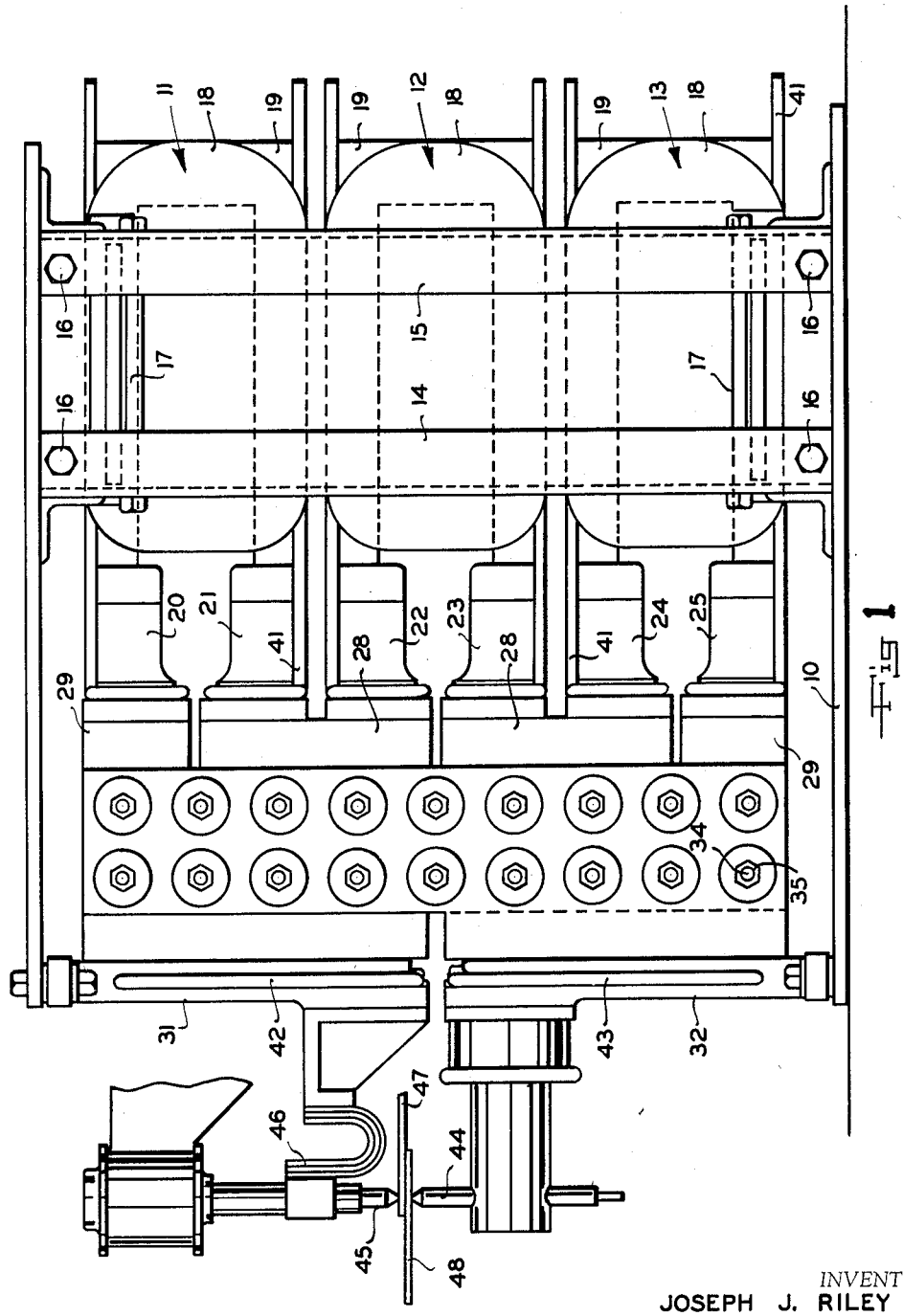
Figure 1 is a side elevation of a transformer-rectifier power pack assembly constructed in accordance with the teachings of my invention; the illustrated apparatus being shown as conventionally utilized in electric resistance welding apparatus.

Referring to the drawing in detail, the reference numeral 10 designates a base member of my apparatus upon the right hand end of which are mounted a plurality of superimposed high step-down ratio transformers 11, 12 and 13 of a type suitable for resistance welding. The transformers 11—13 are rigidly secured in the superimposed relation shown by means of upright angle members 14 and 15 and transverse tie rods 16 and 17, the latter of which connect angles 14 and 15 at their upper ends.

Transformers 11—13 are substantially identical, each comprising a plurality of primary coils 18 between which are sandwiched a plurality of secondary loops 19. In the present illustration secondary loops are of flat cast construction and are shaped in the form of a large U. The forward ends of the U-shaped loops 19 extend horizontally and are projected forwardly of the primary windings 18 as is illustrated in Figure 1. Secured to the projecting ends of the loops 19 are a plurality of secondary terminal pads 20—25 having outwardly facing vertically disposed contact surfaces thereon. In accordance with the teachings of the invention the terminal pads are so aligned that all contact surfaces lie substantially in a single vertical plane. And it will be understood that this may be accomplished by suitably positioning the transformers 11—13 when the same are assembled in superimposed relation and secured by angle members 14 and 15 and tie rods 16 and 17.

The rectifier device of my invention comprises a plurality of elongated input and output conductor plates 26 and 27 respectively of the type shown in Figure 3, each comprising an elongated rectangular body portion and an integral contact tab portion. Tab portions 28 of input plates 27 have a longitudinal dimension of sufficient length to span two adjacent terminal pads of adjacent transformers, as for example adjacent pads 21 and 22 or adjacent pads 23 and 24, whereby a conventional delta connection may be accomplished. Of course, certain of the input conductor plates must be provided with spaced tab portions 29 adapted to overlie the extreme end terminal pads 20 and 25 of the apparatus.

Each of the tab portions 28 or 29 includes a right-angularly disposed outer end contact portion 30 having a flat outer surface adapted for intimate contact with the outer contact faces of two of the terminal pads 20—25 in the manner set forth above. And preferably the portions 30 as well as the contact surfaces of terminal pads 20—25 are plated with a thin layer of silver to improve electrical conductivity between the terminal pads 20—25 and the various input conductors 26, as well as to improve and facilitate the transfer of heat from conductors 26 to the terminal pads as will hereafter appear.

According to the teachings of my invention the input conductor plates 26 are arranged in spaced pairs, and each plate 26 of each such pairs is provided with a right-angularly disposed portion 30 which is directed toward the other, substantially as illustrated in Figure 3, whereby a slot is formed between the adjacent portions 30.

Also in accordance with the teachings of the invention each of the output conductor plates 27 comprises an elongated rectangular body portion substantially similar in size and shape to the body portions of input conductor plates 26. Thus, in assembling the rectifier device input and output conductor plates may be stacked alternately in such manner that the body portions thereof are aligned while various integral tab portions may extend outwardly for contact with terminal pads 20—25, for example, or with positive and negative output terminals 31 and 32 positioned outwardly of the transformer terminal pads 20—25 in the manner shown in Figures 1 and 2.

In my apparatus input and output conductor plates are stacked alternately, and between each of the plates is interposed a plurality of disc-like rectifier elements 33 which, in the usual manner, are adapted to freely pass current in one direction while substantially impeding flow of the same in an opposite direction. Copper sulfide and magnesium rectifier elements have been found most desirable for my purposes due to their high current carrying capacity and favorable electrical characteristics which permit of the rising initial D. C. wave front hereinbefore mentioned.

Preferably all rectifier elements 33 are oriented in the same direction whereby output conductor plates 27 positioned on opposite sides of an input conductor plate 26 may be connected alternately to the positive and negative output terminals 31 and 32. Thus, as observed in Figure 2, output conductor plates 27 in the assembled stack will be connected alternately to terminals 31 and 32.

By my construction the rectifier discs 33 are arranged in a plurality of axially aligned stacks spaced in the manner shown in Figure 1 and are secured by means of an elongated bolt 34 which passes through each of the discs 33 of a stack. By means of nuts 35 the stacks of discs 33 may be tightly compressed between the conductor plates 26 and 27 to insure adequate electrical contact and to provide a rigid and unitary rectifying assembly. Suitable insulating means, not discernible in the drawing, are conventionally provided to prevent shorting out conductor plates of opposite potentials via bolts 34.

As are input conductor plates 26, output conductor plates 27 are arranged in pairs and are provided with integral extending tab portions and right-angularly disposed contact portions 36 and 37 respectively. The tab portions 36 preferably extend approximately half the length of the plates 27 and are adapted for contact with output terminals 31 or 32 or equal length whereby a maximum contact surface is provided. Also, as illustrated in Figure 3, the right-angularly disposed contact portions 37 of each pair of output conductors extend toward each other to form therebetween a slot of predetermined width, it being understood that in the assembled apparatus, plates 26 and 27 will be rigidly maintained in the relation illustrated in Figure 3 by means of bolts 34 and interposed rectifier elements 33.

In providing an open slot between cooperating pairs of conductor plates 26 and 27 I substantially simplify final assembly of the power pack in that accurate alignment of a plurality of spaced holes, both in the conductor plates and in the terminals, is eliminated. It will be understood, of course, that all plates may be so formed that right-angularly disposed contact portions 30 lie substantially in a single plane while all contact portions 37 similarly lie in a second plane which is spaced from the first. Slight inaccuracies which may occur in the planar alignment of the contact portions may be neglected since a certain amount of resiliency is inherent in the relatively thin conductor plates 26 and 27 whereby the same may be deformed into accurate alignment. Thus there is eliminated the former need for accurately machining the contact portions, and further, slight misalignment of the terminal pads 20—25 from a co-planar relationship may be overcome in the same manner.

A preferred arrangement for connecting the conductor plates to terminal pads 20—25 and to output terminals 31 and 32 comprises elongated bars 38 and 39 which are adapted to be positioned between spaced conductor plates of each pair thereof, and to be bolted to the terminal by means of bolts 40 extending through the slot provided between adjacent contact portions of each of said pairs. Preferably the bars 38 and 39 are substantially as long as the contact portions 30 and 37 respectively whereby when the same are drawn evenly toward the terminal pads 23 and 24, for example, a substantially uniform pressure contact is established between the portions 30 and 37 and the transformer and output terminals. Any convenient number of bolts 40 may be used, depending principally upon the length of the bars 38 and 39.

In the illustrated apparatus I provide for the dissipation of heat from the rectifier apparatus and from the transformer secondaries 19 by means of a plurality of heat conductive fluid conduits which are positioned in heat exchange relation to the said apparatus and which are arranged to conduct a coolant fluid such as water, for example, thereabout. Heat generated internally of the rectifier apparatus, i. e., within the conductor plates and rectifier elements, may be extracted therefrom by providing cooling conduits in intimate relation with the terminal pads 20—25 and output terminals 31 and 32. This is made possible by the right-angularly disposed contact portions 30 and 37 which provide excellent heat exchange contact between conductor plates 26 and 27 and the terminals associated therewith whereby heat generated within the rectifier apparatus is quickly conducted to the terminals. Thus, in the instant example I provide a plurality of coolant conduits 41 which extend along the outer longitudinal edges of U-shaped secondary loops 19 to the terminal pads 20—25 and are there looped about the pads 20—25 in heat exchange relation with the contact surfaces thereof. For a similar purpose, conduits 42 and 43 are looped about output terminals 31 and 32 to extract heat from the output side of the rectifying apparatus. Where desired, additional cooling facilities may be provided internally of the rectifying apparatus to further increase the output capacity of the power pack.

Usually it is desirable to furnish in the cooling circuit suitable temperature responsive means, not shown, whereby the flow of water is reduced or discontinued upon the apparatus reaching a predetermined minimum temperature and whereby the flow of current through the apparatus is discontinued upon the same reaching a predetermined maximum temperature. I may thus protect the rectifying device from damage due to condensed atmospheric moisture and from damage due to overheating.

A common application of my apparatus is illustrated in Figure 1 wherein a fixed electrode 44 of a spot welding machine is electrically connected to the lower output terminal 32 and a vertically movable electrode 45 is electrically connected through flexible conductor 46 to the upper output terminal 31. In accordance with usual practice in the electric resistance welding art, electrodes 45 and 46 are moved into pressure contact with overlapped workpieces 47 and 48 whereupon electric energy is applied to the primary windings 18 of transformers 11—13. Where it is desired to vary the output voltage of transformers 11—13 certain of the primaries 18 thereof may be selectively connected to the source or not as the desired output voltage may be of high or low magnitude. Preferably, however, identical connections are made with each of the transformers 11—13 to maintain electrical balance in each of the three phases.

My apparatus is particularly valuable in the resistance welding art due to such features as the close spacing of the transformer terminal pads and the output terminals whereby impedance losses therebetween may be maintained at a practical minimum. Such closeness of spacing is, if course, made possible by my novel rectifier construction where each of the conductor plates may have an elongated body portion even though the same connect to terminals only over a portion of their elongated dimension. Conduction through a substantially greater number of rectifier discs 33 is thus provided without requiring additional otherwise profitably usable space. And it will be readily understood that this feature provides for a substantial increase in the power output obtainable from the apparatus. Thus, in a commercial embodiment of the apparatus described I am able to obtain a one-hundred kva. output rating from power pack apparatus occupying a cubic space of approximately 30" x 25". Such a compact arrangement is ultimately desirable, particularly in the electric resistance welding art where the power pack apparatus may be housed within an enclosed machine frame.

A further desirable feature of my invention resides in its compact and symmetrical physical make-up which insures equal distribution of impedance losses over each of the three phases. A balanced load condition is thus readily obtainable whereby unequal heating of the parts may be substantially prevented. The physical arrangement of the apparatus, combined with the use of copper sulfide and magnesium rectifier elements further insures, when used with resistance welding apparatus, to providing a rising D. C. welding current. This has been found to be very desirable in the welding art in that the workpieces are softened somewhat to improve electrode contact before the welding current reaches its maximum value.

Construction costs and time are greatly reduced by my invention, particularly by my novel use of cooperating pairs of conductors having bent right-angularly disposed contact portions defining a slot for the reception of connecting bolts. My arrangement eliminates drilling and aligning a large number of holes or slots as would otherwise be required and thereby substantially reduces the time required in forming the conductor plates. Also the use of bent contact portion provides for ready assembly of the apparatus where accurate machine work would normally be required. Slight alignment inaccuracies are easily compensated for by deformation of the contact portions of the conductor plates, and it will be understood that this may be accomplished substantially without compromise with the electrical contact between the contact portions and the terminals or terminal pads associated therewith.

Another advantage of my apparatus resides in its capacity to dissipate heat generated internally of the rectifying apparatus by means of cooling conduits positioned externally of the apparatus. The broad area of contact between the terminal pads and the rectifier conductor plates which is provided by the right-angularly disposed contact tabs insures rapid extraction of heat from the rectifier device by direct conduction through the conductor plates. Cooling conduits provided in heat exchange relation to the terminal members may thus be utilized to provide cooling facilities which are adequate for most applications of the apparatus. Ease of assembly and maintenance is a direct result of this arrangement.

It should be understood, however, that the embodiment herein specifically described is intended to be representative only as many modifications may be made therein without departing from the scope of the invention. Reference should therefore be had to the appended claims in determining the true scope of the invention.

I claim:

1. In a direct current power supply for resistance welders and the like the combination of a three-phase transformer bank comprising three single phase transformers disposed in side-by-side relation, each of said transformers including a U-shaped secondary loop, terminal pads connected to each end of each of said secondary loops, said terminal pads having outwardly facing contact surfaces aligned substantially in a single longitudinal plane, direct current output terminals positioned in spaced relation to said terminal pads and having inwardly facing contact surfaces aligned substantially in a single plane parallel to said first mentioned plane, a plurality of spaced parallel rectifier input and output conductor plates stacked in alternate relation and positioned between said pads and said terminals, said conductor plates comprising elongated rectangular body portions, said rectangular body portions being longitudinally disposed and extending substantially between longitudinally extreme terminal pads of said means including bolts extending transversely through said transformer bank, a plurality of rectifier elements interposed between said input and output conductor plates, plates to rigidly clamp said plates and said rectifier elements in current conductive relation, said conductor plates having outwardly extending tab portions and right-angularly disposed contact portions, said contact portions of said output conductors being adapted for flat contact with said terminals and said contact portions of said input conductors being adapted for flat contact with certain of said pads, said conductor plates being arranged in spaced symmetrical pairs having contact portions directed toward each other whereby to define a slot therebetween, and means comprising bolts received in said slots to connect said conductor plates to said terminals and pads.

2. In a direct current power supply for resistance welders and the like the combination of a three-phase transformer bank comprising three single phase transformers disposed in side-by-side relation, each of said transformers including a secondary loop having outwardly extending terminals, terminal pads connected to each of said terminals and having outwardly facing contact surfaces aligned substantially in a single longitudinal plane, direct current output terminals positioned in spaced relation to said terminal pads and having inwardly facing contact surfaces aligned substantially in a single plane parallel to said first mentioned plane, a plurality of spaced parallel rectifier input and output conductor plates stacked in alternate relation and positioned between said pads and said terminals, a plurality of rectifier elements interposed between said conductor plates, means to rigidly clamp said plates in stacked relation, said conductor plates having outwardly extending tab portions and right-angularly disposed contact portions, said contact portions being adapted for contact with said terminals and pads, said conductor plates being arranged in spaced symmetrical pairs having contact portions directed toward each other whereby to define a slot therebetween, and means comprising bolts received in said slots to connect said conductor plates to said terminals and pads.

3. Apparatus according to claim 2 further characterized by said input conductor plates having contact portions adapted for contact with two terminal pads, said plurality of conductor plates including at least three pairs of input conductor plates, each of said pairs being connected to two terminal pads whereby to connect said conductor plates in delta.

4. In a direct current power supply for resistance welders and the like the combination of a three-phase transformer bank having outwardly facing longitudinally disposed co-planar terminal pads, output terminals having inwardly facing longitudinally disposed contact surfaces positioned in spaced parallel relation to said pads, a plurality of spaced parallel rectifier input and output conductor plates positioned between said terminals and pads, said plates comprising complementary elongated longitudinally disposed body portions extending substantially between extreme terminal pads of said transformer bank, said input conductor plates having integrally connected contact portions overlying said pads whereby certain of said input conductor plates may be connected to certain of said pads, said output conductor plates having integrally connected contact portions overlying said terminals whereby certain ones of said output conductor plates may be connected to one of said terminals and certain others of said output conductor plates may be connected to the other of said terminals, and a plurality of rectifier elements interposed between said conductor plates in contact with the body portions thereof.

5. Apparatus according to claim 4 further characterized by said contact portions being right-angularly disposed to said body portions and adapted to overlie said terminals and said pads in flat relation, and said certain of said contact portions of said input conductor plates being adapted to contact more than one terminal pad.

6. Apparatus according to claim 5 further characterized by said conductor plates being arranged in spaced symmetrical pairs having contact portions directed toward each other whereby to define a slot therebetween, and means including bolts received in said slots to connect said contact portions to said terminals and pads.

7. In a direct current power supply for resistance welders and the like the combination of a transformer bank having a plurality of outwardly facing longitudinally disposed co-planar terminal pads, output terminals having inwardly facing longitudinally disposed contact surfaces positioned in spaced parallel relation to said pads, a plurality of spaced parallel rectifier input and output conductor plates positioned between said terminals and pads, said plates comprising complementary elongated longitudinally disposed body portions, a plurality of rectifier elements interposed between said conductor plates in contact with the body portions thereof, said conductor plates having integral right-angularly disposed contact portions adapted to overlie said terminals and pads in flat relation, said conductor plates being arranged in spaced symmetrical pairs having contact portions directed toward each other whereby to define a slot therebetween, and means received in said slots for connecting said contact portions to said terminals and pads.

8. Apparatus according to claim 7 further characterized by said transformer bank comprising a plurality of transformers positioned in side-by-side relation, said transformers having flat U-shaped secondary loops disposed in coplanar relation and having parallel outwardly extending secondary terminals, said terminal pads being connected to said secondary terminals, and certain of said contact portions of said input conductor plates being connected to certain of said pads.

9. Apparatus according to claim 8 further characterized by said plurality of transformers comprising three single-phase transformers, and certain said contact portions of said input conductor plates being connected to at least two of said pads.

References Cited in the file of this patent
UNITED STATES PATENTS
2,601,240    Blair _____ June 24, 1952